(12) United States Patent
Mendeloff et al.

(10) Patent No.: US 10,587,833 B2
(45) Date of Patent: Mar. 10, 2020

(54) SYSTEM AND METHOD FOR AUTOMATED NETWORK SEARCH AND COMPANION DISPLAY OF RESULT RELATING TO AUDIO-VIDEO METADATA

(75) Inventors: Todd Allen Mendeloff, Los Angeles, CA (US); William Joseph Bartley, Venice, CA (US); Brian Kwan, Altadena, CA (US); David Jessen, Sherman Oaks, CA (US); Evan Acosta, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 708 days.

(21) Appl. No.: 12/561,193

(22) Filed: Sep. 16, 2009

(65) Prior Publication Data

US 2011/0064387 A1 Mar. 17, 2011

(51) Int. Cl.
| | |
|---|---|
| *H04N 21/475* | (2011.01) |
| *H04N 21/466* | (2011.01) |
| *H04N 21/84* | (2011.01) |
| *H04N 21/4722* | (2011.01) |
| *H04N 21/258* | (2011.01) |
| *H04N 5/44* | (2011.01) |
| *G06F 16/78* | (2019.01) |
| *G06F 16/738* | (2019.01) |
| *G06F 16/783* | (2019.01) |

(52) U.S. Cl.
CPC ........ *H04N 5/4401* (2013.01); *G06F 16/738* (2019.01); *G06F 16/78* (2019.01); *G06F 16/7844* (2019.01); *G06F 16/7867* (2019.01); *H04N 21/25891* (2013.01); *H04N 21/4667* (2013.01); *H04N 21/4722* (2013.01); *H04N 21/4755* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 5,715,400 A | 2/1998 | Reimer et al. | |
| 5,774,666 A | 6/1998 | Portuesi | |
| 5,790,935 A * | 8/1998 | Payton | 725/91 |
| 5,861,881 A | 1/1999 | Freeman et al. | |
| 5,867,205 A * | 2/1999 | Harrison | 725/38 |
| 5,907,322 A * | 5/1999 | Kelly et al. | 725/51 |
| 6,240,555 B1 * | 5/2001 | Shoff et al. | 725/110 |
| 6,598,226 B1 * | 7/2003 | Sorensen | 725/56 |
| 6,601,103 B1 * | 7/2003 | Goldschmidt Iki et al. | 709/231 |
| 6,859,937 B1 * | 2/2005 | Narayan et al. | 725/37 |
| 7,206,303 B2 * | 4/2007 | Karas et al. | 370/350 |
| 7,343,347 B2 | 3/2008 | Ostrover et al. | |

(Continued)

FOREIGN PATENT DOCUMENTS

| | | | | |
|---|---|---|---|---|
| EP | 1868201 A1 * | 12/2007 | | G06F 17/30749 |
| WO | WO 2002/102079 | 12/2002 | | |
| WO | WO 2007/115224 | 10/2007 | | |

*Primary Examiner* — Fernando Alcon
(74) *Attorney, Agent, or Firm* — Farjami & Farjami LLP

(57) ABSTRACT

Embodiments disclosed herein include systems and methods which allow consumers of audio-visual content (such as movies and television programs) to obtain dynamic additional content about programs and movies being watched, and customize that additional content to their personal preferences and behaviors.

39 Claims, 10 Drawing Sheets

| CONTENT | TIME CODE & FRAME | CATEGORY | VALUE |
|---|---|---|---|
| National Treasure | 00:42:00:04 | Cast | Nicholas Cage |
| National Treasure | 00:42:00:04 | Cast | Diane Kruger |
| National Treasure | 00:42:00:04 | Location | DAR - Memorial Continental Hall.- 1776 D Street NW, Washington, District of Columbia, USA |
| National Treasure | 00:42:00:04 | Cast | Jon Voight |
| National Treasure | 00:42:00:04 | Technical: Camera | Panavision Cameras and Lenses |
| National Treasure | 00:42:00:04 | Technical: Cinematographic process | Super 35 |
| National Treasure | 00:42:00:04 | Crew:Director | Jon Turteltaub |
| National Treasure | 00:42:00:04 | Crew:location scout | Jonathan Reich |
| National Treasure | 00:42:00:04 | Dialogue | Closed Captioning for frame |
| National Treasure | 00:42:00:05 | Cast | Nicholas Cage |
| National Treasure | 00:42:00:05 | Cast | Nicholas Cage |

700

(56) References Cited

U.S. PATENT DOCUMENTS

| | | | |
|---|---|---|---|
| 7,657,526 B2* | 2/2010 | Aravamudan | G06F 17/30035 707/750 |
| 7,793,326 B2* | 9/2010 | McCoskey et al. | 725/91 |
| 7,865,927 B2* | 1/2011 | Brodersen et al. | 725/109 |
| 8,001,116 B2* | 8/2011 | Cope | 707/724 |
| 8,046,803 B1* | 10/2011 | Lee | H04N 21/2668 725/32 |
| 8,051,450 B2* | 11/2011 | Robarts et al. | 725/53 |
| 2001/0001160 A1* | 5/2001 | Shoff | H04N 5/44543 725/51 |
| 2002/0078467 A1* | 6/2002 | Rosin et al. | 725/110 |
| 2002/0112247 A1* | 8/2002 | Horner et al. | 725/112 |
| 2002/0188958 A1* | 12/2002 | Miller | 725/112 |
| 2002/0199002 A1 | 12/2002 | Quimby | |
| 2003/0110507 A1 | 6/2003 | Dimitrova et al. | |
| 2005/0091597 A1 | 4/2005 | Ackley | |
| 2005/0097190 A1 | 5/2005 | Abdelhak et al. | |
| 2005/0188404 A1* | 8/2005 | Dacosta | 725/52 |
| 2005/0273810 A1 | 12/2005 | Zimmerman et al. | |
| 2006/0143674 A1* | 6/2006 | Jones et al. | 725/113 |
| 2006/0271980 A1 | 11/2006 | Mankovitz | |
| 2007/0039020 A1 | 2/2007 | Cansler et al. | |
| 2007/0053513 A1 | 3/2007 | Hoffberg | |
| 2007/0130602 A1* | 6/2007 | Gulli et al. | 725/113 |
| 2009/0070324 A1* | 3/2009 | Yoshino | H04N 7/17318 |
| 2009/0094113 A1* | 4/2009 | Berry | G06F 17/30017 705/14.73 |
| 2009/0113469 A1* | 4/2009 | Jo | H04N 7/17318 725/32 |
| 2010/0154004 A1* | 6/2010 | Liu et al. | 725/53 |
| 2010/0262996 A1* | 10/2010 | Chang | 725/43 |

* cited by examiner

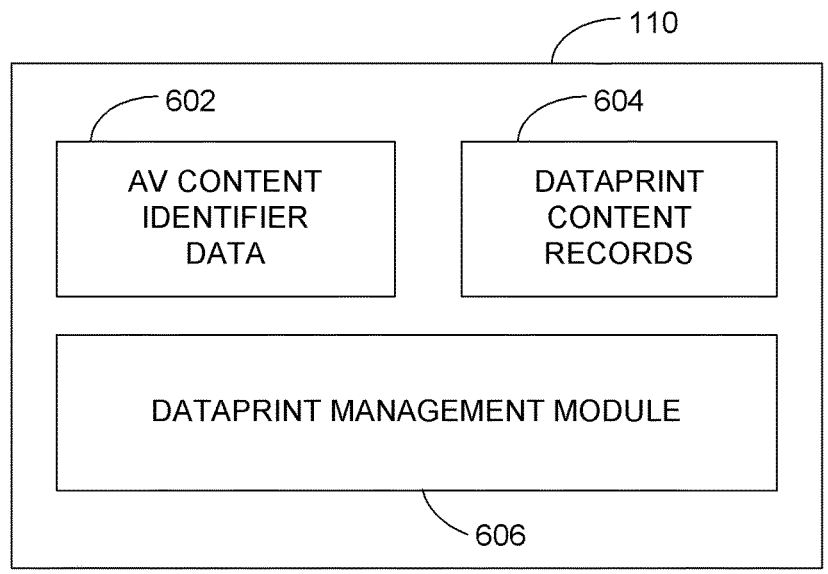

FIG. 6

| CONTENT | TIME CODE & FRAME | CATEGORY | VALUE |
|---|---|---|---|
| National Treasure | 00:42:00:04 | Cast | Nicholas Cage |
| National Treasure | 00:42:00:04 | Cast | Diane Kruger |
| National Treasure | 00:42:00:04 | Location | DAR - Memorial Continental Hall.- 1776 D Street NW, Washington, District of Columbia, USA |
| National Treasure | 00:42:00:04 | Cast | Jon Voight |
| National Treasure | 00:42:00:04 | Technical: Camera | Panavision Cameras and Lenses |
| National Treasure | 00:42:00:04 | Technical: Cinematographic process | Super 35 |
| National Treasure | 00:42:00:04 | Crew:Director | Jon Turteltaub |
| National Treasure | 00:42:00:04 | Crew:location scout | Jonathan Reich |
| National Treasure | 00:42:00:04 | Dialogue | Closed Captioning for frame |
| National Treasure | 00:42:00:05 | Cast | Nicholas Cage |
| National Treasure | 00:42:00:05 | Cast | Nicholas Cage |

FIG. 7

SYSTEM AND METHOD FOR AUTOMATED NETWORK SEARCH AND COMPANION DISPLAY OF RESULT RELATING TO AUDIO-VIDEO METADATA

BACKGROUND OF THE INVENTION

Field of the Invention

This application relates to automated content searching in computer networks. More particularly, this application relates to a system and method of presenting additional information about audio-visual content to a viewer.

Description of the Related Technology

Traditionally, television and movie viewing were relatively linear, "live" experiences in which television was broadcast over the air, and movies were presented to the general public in movie theaters at scheduled times. In order to watch a television program episode a viewer was required to tune in at a specific time to a specific channel. Similarly, in order to see a movie, a person would go to a movie theater to watch the movie at its scheduled time.

Over the years, advances in technology have provided the public with more control over the timing of the viewing experience. For example, video cassette recording (VCR) technology allowed for movies to be distributed on tape for customers to play at their convenience using video cassette players. Video cassette recorders also allowed for the recording of television for later viewing. More recently, it has become common for movies and videos to be digitally encoded and distributed via DVD and other types of electronic media such as digital video recorders (DVRs). Because DVDs often are capable of storing large amounts of data beyond the television or movie content, content distributors began to accompany the programming content with other additional material related to the movie or television programming. For example, many DVDs have included "behind the scenes" materials, interviews with actors/directors/producers about the production, and the like for more than ten years. This type of accompanying material is often referred to as DVD extras or bonus materials.

The content of the DVD extras is typically controlled by the content producer, so while the curious viewer is provided additional relevant content about the television program or movie stored on the DVD, the viewer lacks meaningful control or discretion with respect to the content of the DVD extras. Thus, the ability of viewers to obtain desired additional information about the movie or television program on the DVD is generally limited to the accompanying content written to the DVD. This accompanying content is often costly to create. Moreover, due to the static nature of DVD recordings and limitations of the physical medium, the accompanying content is generally static and fixed, and cannot be enhanced once the DVD has reached its distribution channels. Thus, current systems and methods of providing additional information about audio-visual content (such as television programs and movies) are inadequate.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

A first inventive aspect is an audio-visual entertainment system. The audio-visual entertainment system comprises an audio-visual data reader configured to read and process audio-visual data from an audio-visual storage device. The system further includes audio and visual outputs configured to receive the processed audio-visual data and output the audio-visual data to a first display area of a first display device. A dataprint request module is configured to identify the audio-visual data and download into a memory a dataprint associated with the identified audio-visual data from a dataprint server. The system further includes a query module configured to process the dataprint and generate queries based on at least the dataprint and query usage guidelines. The query module further receives data in response to the queries and displays the received data in a second display area.

A second inventive aspect is a method of providing audio-visual content to a user. The method includes receiving audio-visual content in a media player device and identifying the audio-visual content. The method further includes requesting a dataprint associated with the audio-visual content. The dataprint comprises records associated with specified portions of the audio-visual content. The requested dataprint is received and stored in a memory. The method further includes playing the audio-visual content in a first display area and repeatedly generating queries based at least in part on one or more of the dataprint records associated with a currently playing portion of the audio-visual content. The query results are displayed in a second display area.

BRIEF DESCRIPTION OF THE DRAWINGS

FIG. 6 is a block diagram providing a more detailed view of the dataprint storage module shown in FIG. 1.

FIG. 7 is a block diagram showing a more detailed view of the dataprint content shown in FIG. 6.

DETAILED DESCRIPTION OF CERTAIN INVENTIVE EMBODIMENTS

Embodiments disclosed herein include systems and methods which allow consumers of audio-visual content to obtain dynamic additional content (which can change over time) about the audio-visual content being consumed, and customize the additional content to their personal preferences. As used herein, the term "audio-visual content" refers to audio content, video content, and some combination of both. Accordingly, audio-visual content may include movies, television programs, songs, music videos, video games, and the like. In particular, using the systems and methods disclosed herein, new and interesting additional content related to a song, movie, television program, or even video game may be generated each time the song, movie, television program, or video game is played by the consumer.

The additional content is provided by automatically generating search queries based on a dataprint which may be associated with the portion of the song, television program or movie currently being played, and then displaying query results to the viewer in a display. For example, the dataprint may include information about the location at which the current scene in a film or television program was filmed, and the generated query may be related to that scene location. The dataprint may also include information such as the type of camera used, the lighting used, etc., and the generated queries may relate to these types of data as well.

The additional content may take various forms. In one embodiment, the additional content may include web pages that are returned by the generated search engine queries. In some embodiments, the generated queries may search Internet search engines in real-time for content, and may automatically display the top ranked search result to the user. By searching in real-time, the system may potentially deliver new and/or different pages to the viewer each time the audio-visual content is viewed because the search may capture newly indexed web pages.

The dataprint which is used to formulate the queries may include metadata about the television program or movie, and may be stored separately from the audio-visual content. In some embodiments, the dataprint may be stored on a network-connected server which allows the dataprint to be updated independently of the distribution of the audio-visual content, thereby providing an additional mechanism to deliver dynamic additional content to viewers. As a result, the dataprint may be enhanced or modified over time to include additional relevant data about the audio-visual content which allows new queries to be generated and new additional content to be delivered. Using the embodiments disclosed herein, the cost of creating additional content for audio-visual content may be greatly reduced. Moreover, by generating additional content using computer network searching the ability to generate additional content is not limited by the physical medium on which the audio-visual content is stored.

Figure 1:
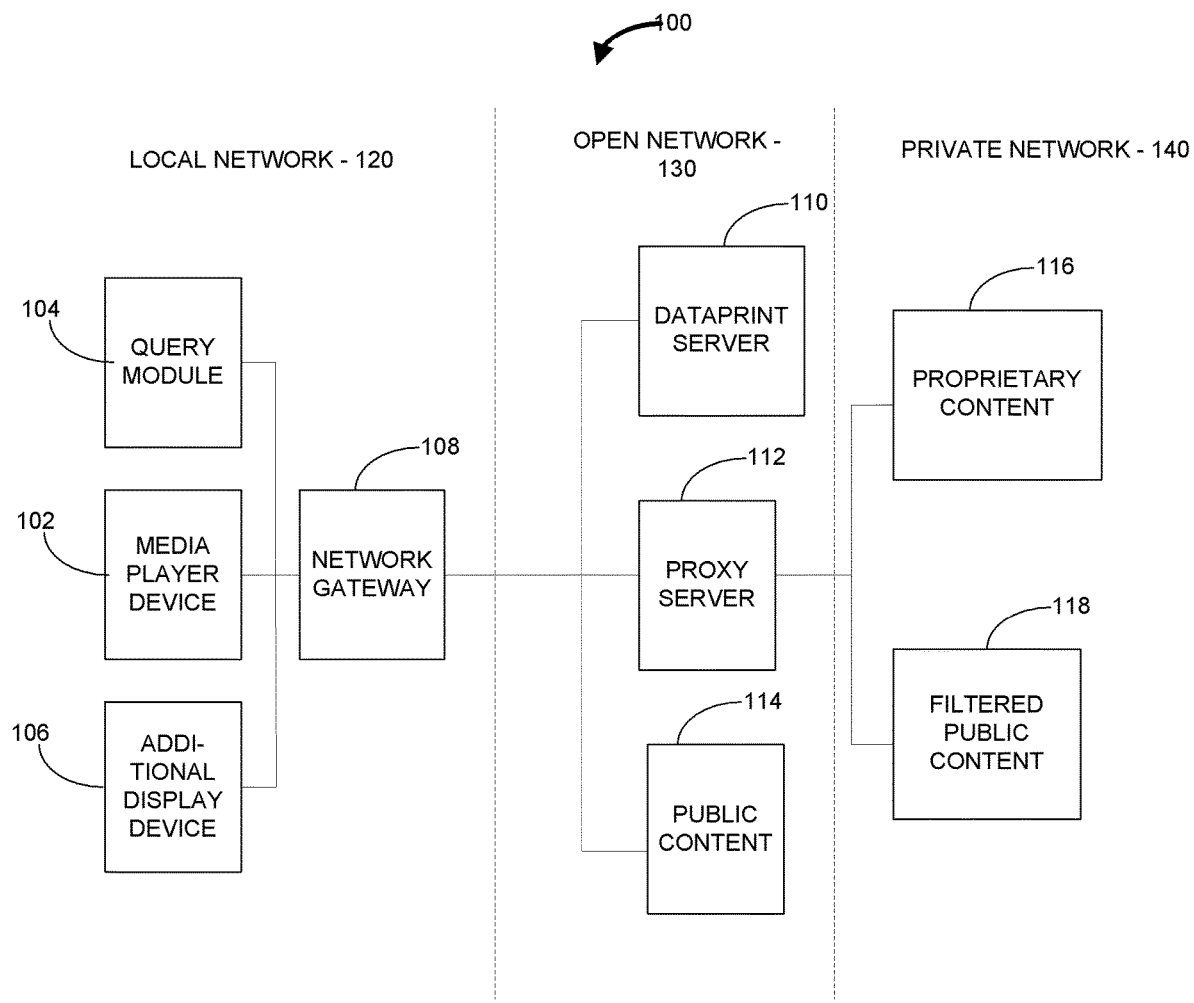
FIG. 1 is a top level diagram of a system for providing automated search and companion display of additional content relating to video metadata in accordance with one or more embodiments.

Turning to FIG. 1, an example of a top level diagram of system 100 which provides automated search and display of additional content relating to video metadata is provided. The system 100 includes a media player device 102. The media player device 102 is typically a device which is capable of playing digital media for a user of the device. The media player device 102 may take various forms. In one embodiment, the media device may be a Blue-ray player device which is capable of playing discs and/or other digital media. The media player device may alternatively be, but not limited to, a digital video recorder (DVR), a portable digital video player, a gaming console, a set top box, a personal computer, a digital audio player, or some other type of media player. The media player typically outputs audio-visual media such as television programming or movies to a display watched by the viewer.

The system 100 may further include a query module 104 which is configured to generate queries, and deliver the query results for display to a user as will be described in detail below. Typically, the generated queries are submitted to search engines via a computer network. The query module may take the form of a software module in the media player device 102. It may also be some combination of hardware and software that is part of the media player device 102. Alternatively, the query module may be a separate hardware and/or software component that is connected or communicates with the media player device 102 via a network or some other type of connection.

In some embodiments, the additional content retrieved by the query module may be displayed by the media player device 102. For example, the query results may take advantage of a picture-in-picture capability of the media player device 102 and display the query results in an inset window. Alternatively, an additional display device 106 may also be included in the system and be configured to display separately from the audio-visual media. The additional display device may take various forms. In one typical embodiment, the additional display device 106 may be a personal computer with a display, and the query module 104 may be partially installed on the personal computer. The query module 104, media player device 102, and the second display device 106 may be in communication via a local network 120. The local network may be a IP-based network, a local network of Bluetooth enabled devices, or some other type of local network.

As noted above, the query module 104 may be configured to generate queries and retrieve query results via a computer network. In some embodiments, the computer network may be accessed via a network gateway 108 which allows the query module 104 (and the media player device 102 and additional display device 106) to send its generated queries to other devices on the network. Typically, the network gateway 108 provides access to a wide area network such as an open network 130, for example, but the network may also be a closed proprietary network or some other type of network. In certain embodiments, portions of the network are "open" and accessible via the Internet, while other portions of the network are "closed" and must be accessed via a proxy or some other type of access mechanism.

The system 100 may also include dataprint source 110. The dataprint source 110 typically takes the form of a database server which stores dataprint records related to audio-visual content such as movies, television programs and the like. As will be discussed in further detail below, the dataprint source 110 may be accessed by any or all of the media player device 102, the query module 104, or the additional display device 106 to obtain a dataprint for audio-visual content such as movies or television programs. Some or all of the dataprint may be downloaded and stored by the query module 104, and the dataprint may then be processed in order to generate queries. The generated queries may be based on the data in the dataprint and, in certain embodiments, the current location of a video being played by the media device.

As noted above, certain portions of the network may be open or unprotected, while other portions may be restricted. In order to manage access, a proxy server 112 may be provided which is configured to manage network access to a private network 140. In one embodiment, the private network 140 may include a proprietary assets module 116 which serves as a repository for certain data for which access may be restricted. Queries generated by the query module 104 may be transmitted through the proxy 112 to the proprietary content module 116. The queries may retrieve certain proprietary content related to a dataprint.

In some embodiments, an audio-visual content provider may wish to ensure that generated queries do not return any inappropriate data to the viewer. When query results are obtained from the open Internet 130, there is a risk that the query results may include inappropriate content due to the unregulated nature of the open network 130. Inappropriate data may include sexual content, copyrighted content, age-inappropriate content, violent content, or some other type of content that should not be displayed to a viewer. Accordingly, the proxy 112 may provide access to filtered public content 118. The filtered public content 118 may include query results obtained from the public content 114 (which is on the open network 130), with inappropriate content filtered out. Alternatively, a white list approach may be utilized in which the filtered public or private content 118 is gathered and stored in a white list behind the proxy server 112, and the queries generated by the query module 104 are submitted against the filtered public content.

Figure 2:
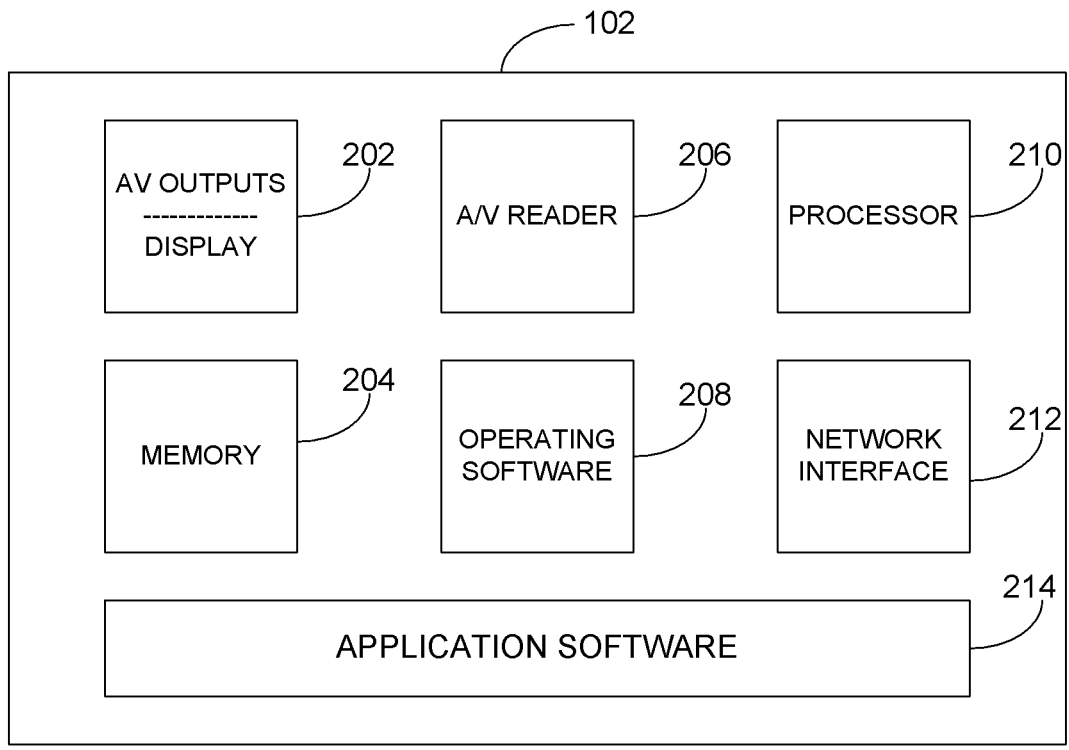
FIG. 2 is a block diagram providing a more detailed view of the media player device shown in FIG. 1.

Turning now to FIG. 2, a detailed view of the media player device 102 from FIG. 1 is provided. As noted above, the media player device 102 may take various forms, including a Blu-ray player, a digital video player, a personal computer with audio-visual player software, or the like. As shown, the media player device 102 may include a display 202. The display 202 may form part of the media player device 102, or it may be a separate hardware component which is connected to the media player device 102. For example, the display 202 may be a television which is connected to a Blu-ray player. The media player device 102 may also include a memory 204. The memory 204 may be volatile memory such as some form of random access memory, or it may be non-volatile memory such as flash memory or a hard disk drive.

The media player device 102 may also include operating software 208. The operating software 208 may be a conventional operating system such as Windows, MacOS or Linux, or it may be a stripped down version of an operating environment such as a Java Virtual Machine. The operating software may include software routines which allow for the presentation of advanced content such as DVD extras, for example. The media player device 102 may further include an audio-visual content reader 206. The audio-visual content reader 206 includes software and hardware which is capable of reading and processing audio-visual content (such as a DVD-ROM, for example) in order to output the processed data on the display 202. The media player device 202 may further include a processor 210. The processor 210 may be a conventional central processing unit (CPU) such as those manufactured by AMD, Intel, or it may be a specialized processor. The processor 210 may be configured to execute computer instructions from the operating software 208 or other software stored in the memory 204. Finally, the media player device 102 may also include a network interface 212. The network interface 212 may take the form of a network interface card and its corresponding driver software which allows the media player device 102 to communicate with external networks. The media player device 102 may further include application software 214. The application software 214 may include software which provides additional functionality to the media player device. In some embodiments, the application software 214 may include a dataprint request module which is configured to request a dataprint from the dataprint source 110 via the network interface 212.

In one particular embodiment, the media player device 102 may be a Blu-ray player connected to an external display such as a high-definition television, for example. The Blu-ray player may include features such as Blu-ray Disc Java (BD-J), which is supports display of advanced content on Blu-ray Disc. BD-J may support network access through the network interface 212, and provide picture-in-picture viewing through the display 202. BD-J may further provide access to expanded local storage in the memory 204 via Java-based operating software 208.

As noted above, the system 100 may further include a query module 104. Although the query module 104 is shown in FIG. 1 as a component that is separate from the media player device 102 and the additional display device 106, a skilled technologist will readily appreciate that the query module 104 may be integrated with one or both of the other devices, or it may be a separate hardware and/or software component that exists separately from them. The query module 104 may include various sub-modules shown in FIG. 3.

For example, the query module 104 may include a query generator 302. The query generator 302 may take the form of a software module that generates queries and sends the generated queries through the network gateway 108 to computer systems located on the open network 130 or private network 140. In some embodiments, the query generator 302 may form queries which are submitted to Internet search engines such as Google or Yahoo, for example. In response to the queries, the Internet search engines may return web pages, files, websites, or web addresses which are most relevant to the submitted queries. As will be discussed below in connection with FIG. 8, the query generator may be configured to submit queries which seek data related to different types of media. For example, the query generator 302 may submit a query to a search engine seeking web page result, while it may submit another query to a search engine which seeks only images. In some embodiments, the query generator 302 may be implemented using application programming interfaces (API's) which are made available by search engine operators. Alternatively, the query generator may be implemented via generic HTTP protocol scripting or some other type of custom application programming interface.

The query module 104 may further include query usage guidelines 304. The query usage guidelines 304 typically include variable parameters which control the types of queries generated by the query generator 302. The parameters may be user-defined, machine-defined, or a combination of both, and are discussed in further detail below. Also included in the query module 104 may be a query results hander 306. The query results handler 306 is typically configured to process the data received in response to the queries generated by the query generator 302. In some embodiments, the query results hander 306 may be configured to receive the query results and provide the query results to appropriate software for display to the viewer. For example, if a query returns video data, the query results handler 306 may be configured to launch a video player and send the video data to the video player. Alternatively, if the query returns web site, the query results handler 306 may be configured to launch a web browser and access the web site using the web browser.

The query module may also be configured to store historical data about queries previously generated by the query module 104. In one embodiment, the query module 104 may be configured to store user-defined favorite queries 308 relating to specific audio-visual content. For example, a viewer may watch a particular movie, such as "Cinderella." As the movie is played for the viewer, the query generator 302 may generate queries relating to the dataprint for "Cinderella" and additional content is displayed to the viewer concurrently with the movie. If the viewer enjoys the additional content which is displayed as a result of data returned in response to the generated queries, the viewer may designate the set of queries as "favorite" queries. When the movie "Cinderella" viewed again in the future, the same additional content may then be displayed to the viewer.

Figure 3:
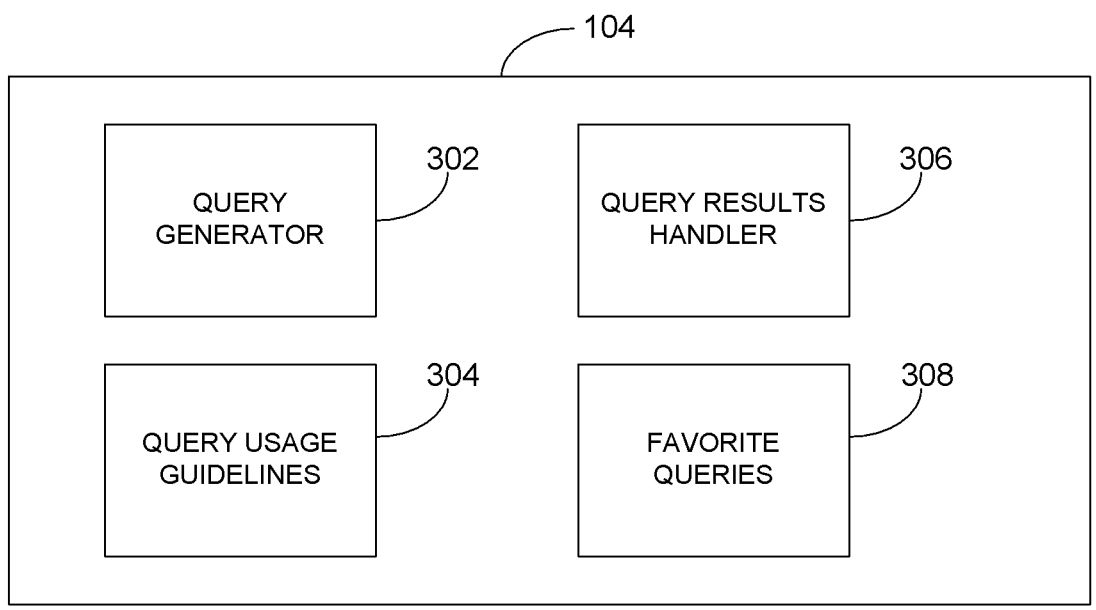
FIG. 3 is a block diagram providing a more detailed view of the query module shown in FIG. 1.
Figure 4:
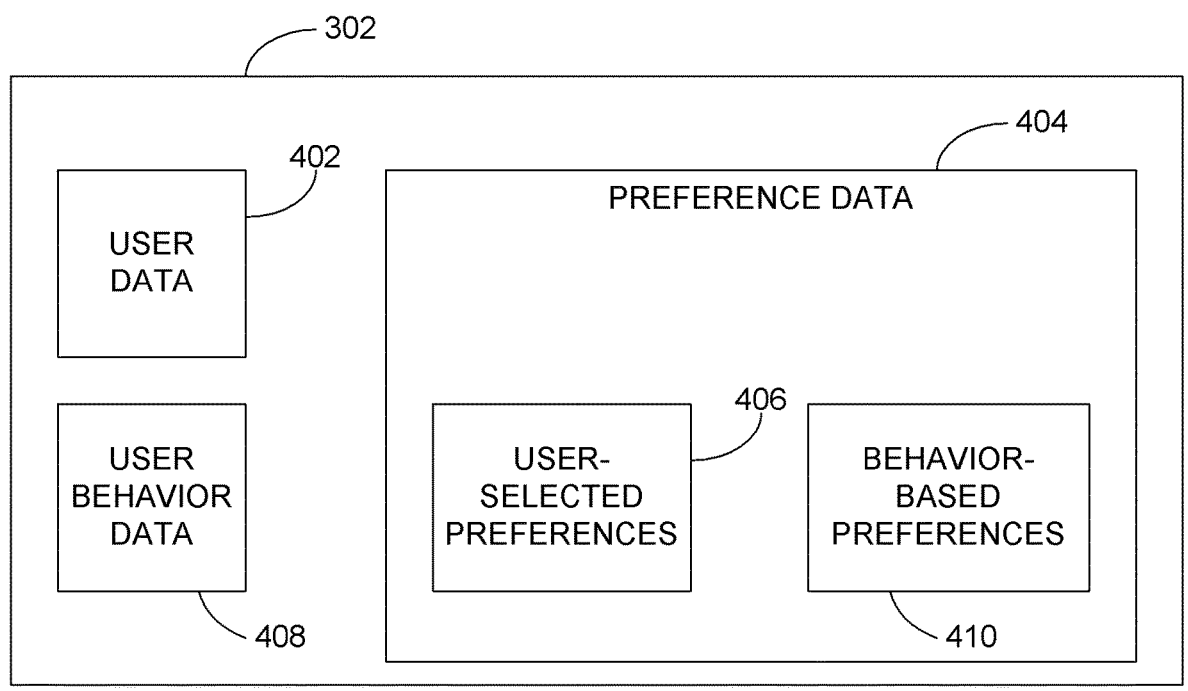
FIG. 4 is a block diagram providing a more detailed view of the query usage guidelines shown in FIG. 3.

FIG. 4 is a block diagram providing a more detailed example of query usage guidelines 304 shown in FIG. 3. As noted above, the query usage guidelines 304 typically include parameters which influence the types of queries generated by the query generator 302. As shown, the query usage guidelines may be provided on a per-user basis, to account for different tastes among different users of the query module 104. User accounts 402 may be stored to allow the query module 104 to tailor its queries to specific preferences of individual users. The query usage guidelines 304 may further include preference data 404. Preference data 404 typically provides information regarding the query preferences of individual users. In the example shown in FIG. 4, there are two types of preference data 404 that are provided. The preference data 404 may include user-selected preference 406 and behavior-based preferences 410. The user-selected preferences are those preferences which are set by the user. The query module 104 may be store user behavior data 408 which tracks user behavior with respect to returned query results to determine which types of returned data is typically more appealing to a user. The user behavior data 408 may be compiled by tracking the types or categories of returned data that are selected by the user for further interaction. Based on the user behavior data 408, behavior-based preferences 410 may also be defined for each user of the system.

Figure 5:
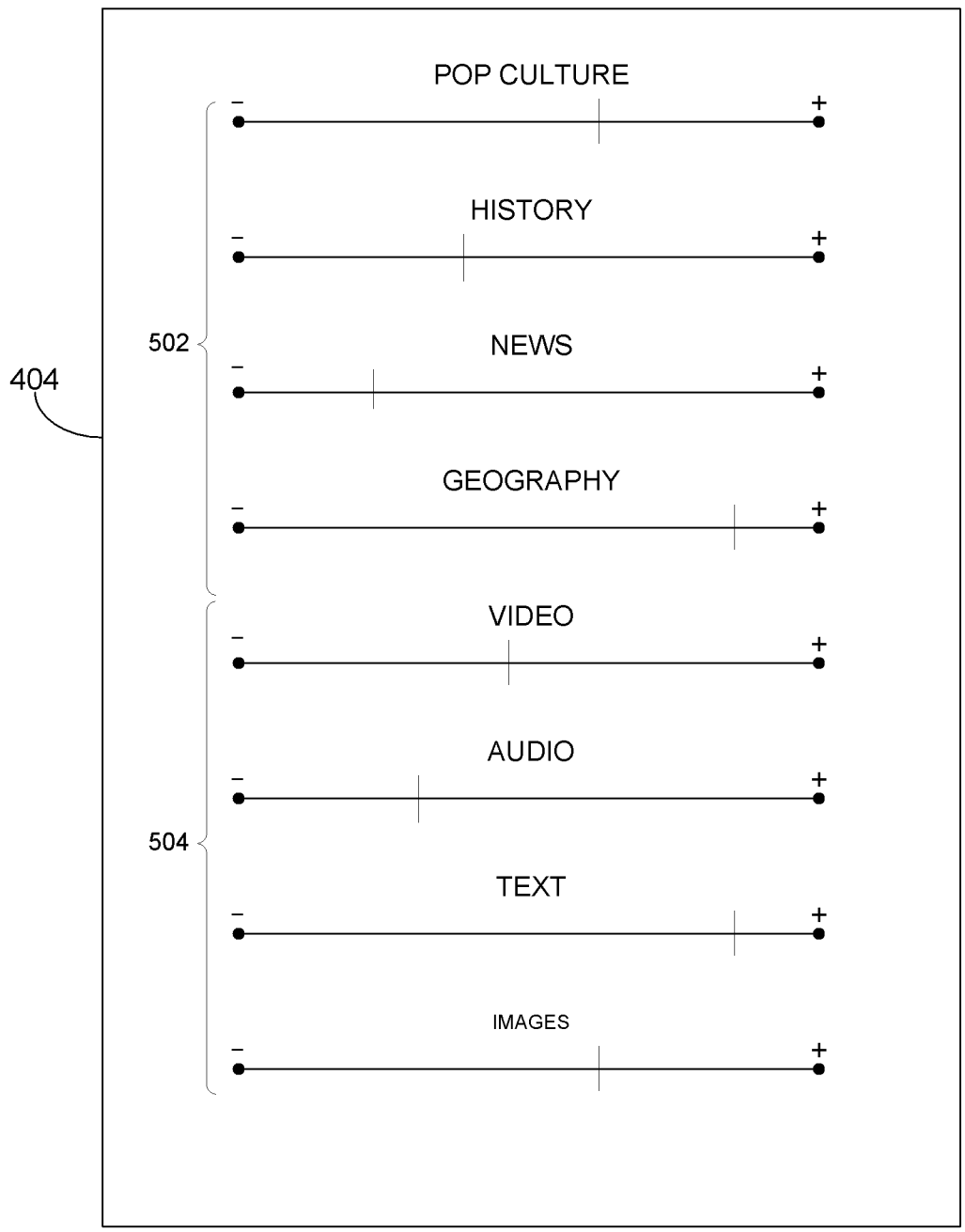
FIG. 5 is a more detailed example of preferences that may be provided via the query usage guidelines shown in FIG. 4.

As noted above, preference data 404 may be stored in the query usage guidelines 304, and the preference data 404 may be used to influence the specific types of queries which are generated by the query generator 302. FIG. 5 is a more detailed view of preferences 404 that may be defined in the preference data. Although certain preferences are shown in FIG. 5, a skilled technologist will appreciate that many other types of preferences may be defined. As shown in this particular embodiment, preferences may be defined for various categories to reflect interests of the viewer. In this particular example, there are two groups of categories: topical preferences 502 and data-type preferences 504. The topical preferences 502 include the types of subject matter the user finds interesting. In the example provided in FIG. 5, the preferences may be set by a user based on a sliding scale which is indicative of their interest in that particular attribute. Thus, the topical preferences shown in FIG. 5 indicate that the user has a more than typical interest in pop culture and geography, but a less than typical interest in history and news. Based on these types of settings, the queries generated by the query generator 302 may weigh more heavily to the higher interest topics.

In some embodiments, viewers may set preferences relating to the type of data returned by the generated queries. In these embodiments, the data-type preferences 504 may be used to control the types of data to retrieve and display to the viewer in response to generated queries. In the example provided in FIG. 5, the text preference is set high, while the audio preference is set low. In accordance with these settings, the query module 104 provides more text-based query results to the user (such as web sites, for example), and fewer audio-based results (such as MP3 files).

The queries generated by the query module 104 may be based on the query usage guidelines 304 and also on a dataprint associated with audio-visual content. FIG. 6 is a block diagram providing a more detailed view of a dataprint source 110 shown in FIG. 1. As shown in this example, the dataprint source 110 is a server. The dataprint server may include content identifier data 602. The content identifier data 602 may be used to identify a particular movie, television program, or other type of audio-visual content for which a dataprint is created. Each particular audio-visual content item identified in the content identifier data 602 may include dataprint content data associated with the audio-visual content item. The dataprint content data 604 may be structured so that particular records in the dataprint content are associated with specific portions of the audio-visual content. The dataprint content data may be collected in various ways. In one embodiment, data relating to the audio-visual content may be collected. The collected data may be provided to the dataprint source 110. The dataprint source 110 may be configured to associate the data with specific portions of audio-visual content, as discussed below in connection with FIG. 7.

Turning briefly to FIG. 7, a sample record set 700 is provided which illustrates how dataprint records may be associated with specific portions of audio-visual content. In this particular example, several dataprint records for the film "National Treasure" are provided. There are four record fields: content, time code and frame, category, and value. Because the dataprint items are all associated with "National Treasure," the value for the "content" field is "National Treasure" in each row of the table. The "frame" column includes data which indicates the time code and/or frame in the movie to which the dataprint records is associated. Thus, the record in the first row is associated with the fourth frame at 0 hours, 42 minutes and 0 seconds. Each of the next eight rows is also associated with that same frame in the movie. The ninth row is associated with the next frame, the fifth frame at 0 hours, 42 minutes and 0 second. Thus, each time code and frame in the movie may have zero or more dataprint content records associated with it.

Figure 8:
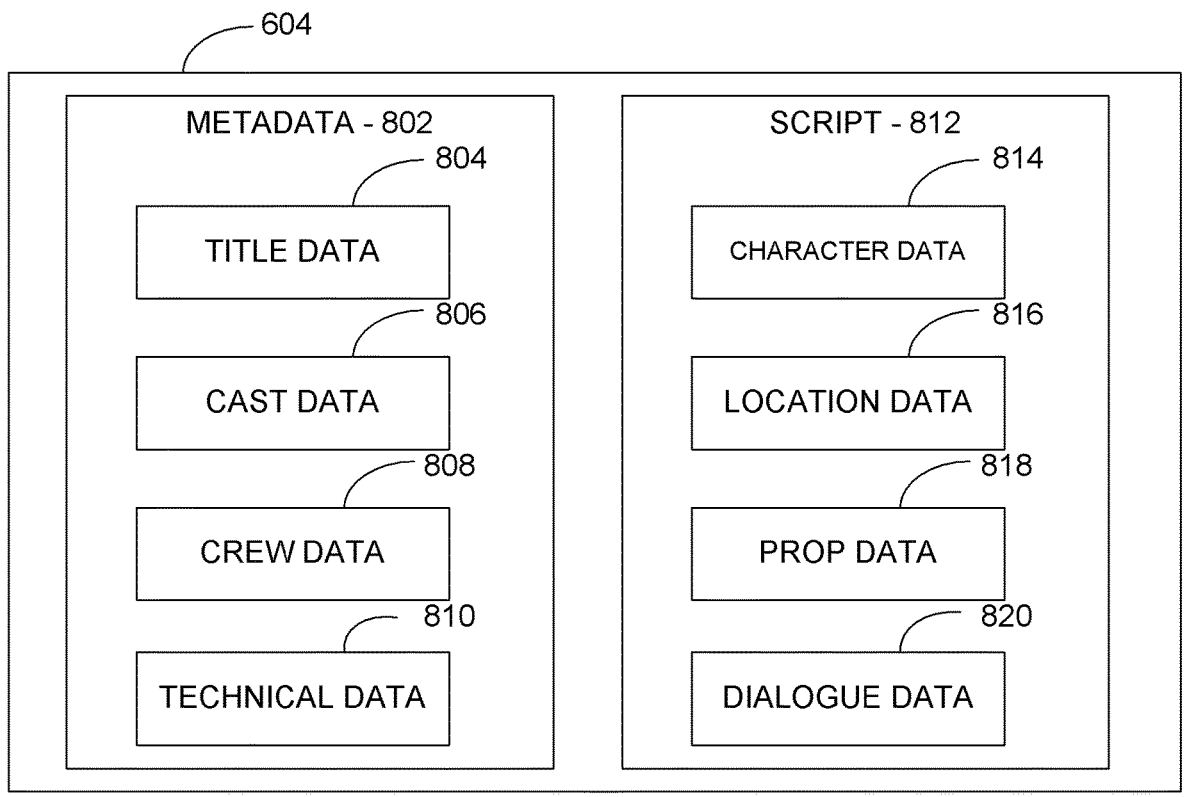
FIG. 8 is an example of dataprint content which may be associated with specific frames in a video.

FIG. 8 is a more detailed view of the type of data which may be stored as dataprint content data 604. As shown, the dataprint content data 604 may include audio-visual content metadata 802. The metadata 802 may include title data 804 which provides information about the title of the audio-visual content. The metadata 802 may further include cast data 806 which provides information about actors and other cast members for the movie or television program. The metadata may further include crew data 808 which may include data relating to crew members such as the director of a film, the producer, or some other crew-related data. The metadata 802 may also include technical data 810 such as the type of film used in shooting the movie, the type of audio sound, or other technical information. Although specific types of metadata are shown in FIG. 8, it is to be appreciated that these are merely examples of the types of data that may be included in a dataprint, and that any other metadata related to the audio-visual content may be stored in the dataprint content data.

The dataprint content data 604 may also include script data 812. The script data 812 may include data which is generally drawn from the movie or television program script. The script data may include character data 814 drawn from the characters present in a particular scene in the movie. The script data 812 may further include location data 816 that provides information related to the location at which a particular scene in a movie or television program was filmed. In addition, the dataprint may also include prop data 818 which may include data about theatrical properties, commonly referred to as props, which may include objects held or used in furthering the plot or story line of a movie or television program. The script data 812 may also include dialogue data 820. The dialogue data 820 may include the spoken dialogue that takes place between characters.

The dataprint content described above may be captured using a variety of data capture techniques. For example, the dialogue data 820 may be captured from the closed captioning data which is associated with the audio-visual content. Other data may be manually input into the dataprint. Still other data, such as location data, for example, may be captured using geo-coding techniques implemented on the cameras used to film each particular scene in a movie. In sum, the data captured in the dataprint may be collected in various ways, and the data may include virtually any data item that is relevant or related to the audio-visual content associated with the dataprint.

Figure 9:
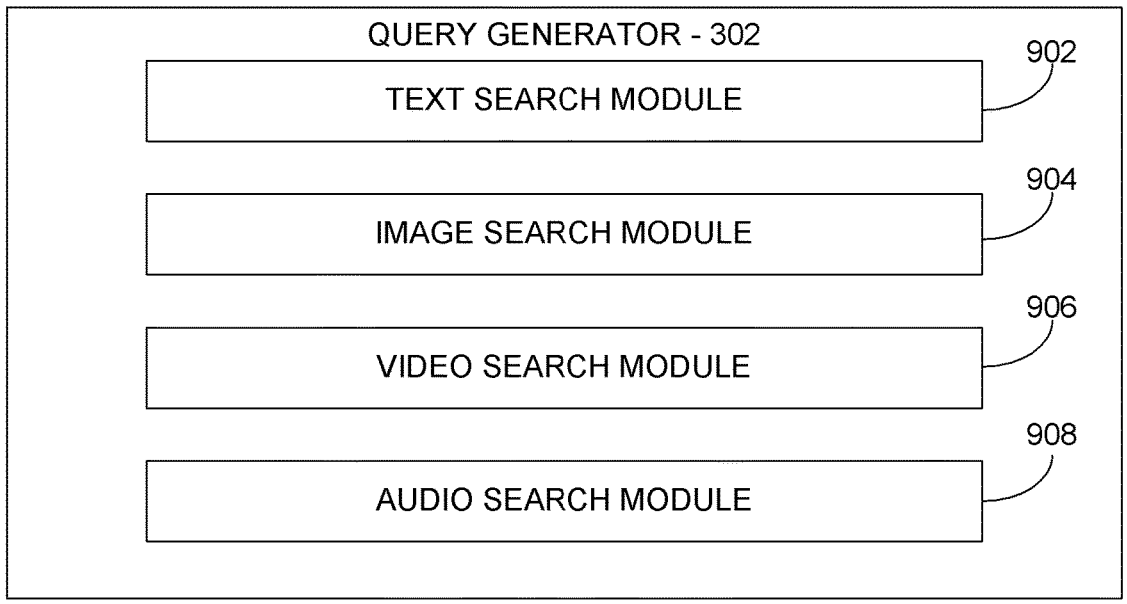
FIG. 9 is a block diagram providing a more detailed view of the query generator from FIG. 3.

Turning now to FIG. 9, a more detailed view of the query generator 302 is provided. As noted previously, the query generator is generally configured to generate queries which are based on the dataprint and preferences. Because different types of search results may be sought in connection with the search queries, the query generator 302 may include various sub-modules for locating different types of media. As such, the query generator may include a text search module 902. The text search module 902 is configured to generate queries for which the returned results will include text-based data such as web sites or web pages. The query generator 302 may also include an image search module 904. The image search module 904 provides the ability to generate queries which identify images relevant to the generated search query. Similarly, the query generator 302 may also include video search module 906 and an audio search module 908. These sub-modules may be used to search for video and audio data related to the generated search queries. Although specific examples of different search modules are provided, it is to appreciated that still additional types of data may be returned. For example, Flash games, applications, or widgets may also be downloaded and presented to the user.

In certain embodiments, the generated queries may be submitted to search engines. In some embodiments, each of the sub-modules shown in FIG. 9 may be configured to send the query generator may be configured to submit queries which request a specific type of data from the search engine. For example, the text search module 902 may request only web sites and web pages as results, while the video search module may request only video pages as query results. In some embodiments, all of the searches may be submitted to the same location. For example, the query generator 302 may be configured to submit all of its queries to a specific search engine such as Google, for example. Each of the sub-modules may be configured to request its specific datatype from the search engine. The search engines may process the queries and return search results.

Typically, search engines return more than one item in response to a specific query. For example, if a user submits a search for "President Obama," a search engine will typically return thousands of relevant pages. All of the thousands of returned pages cannot be displayed to the user. Accordingly, the query results handler 306 may be configured to select which of the returned results to display to the user. In one embodiment, the query results handler 306 may be configured to automatically display the highest ranked result returned from each query. Alternatively, the results handler 306 may also be configured to select one of the pages from the results, but not necessarily the first page.

Figure 10A:
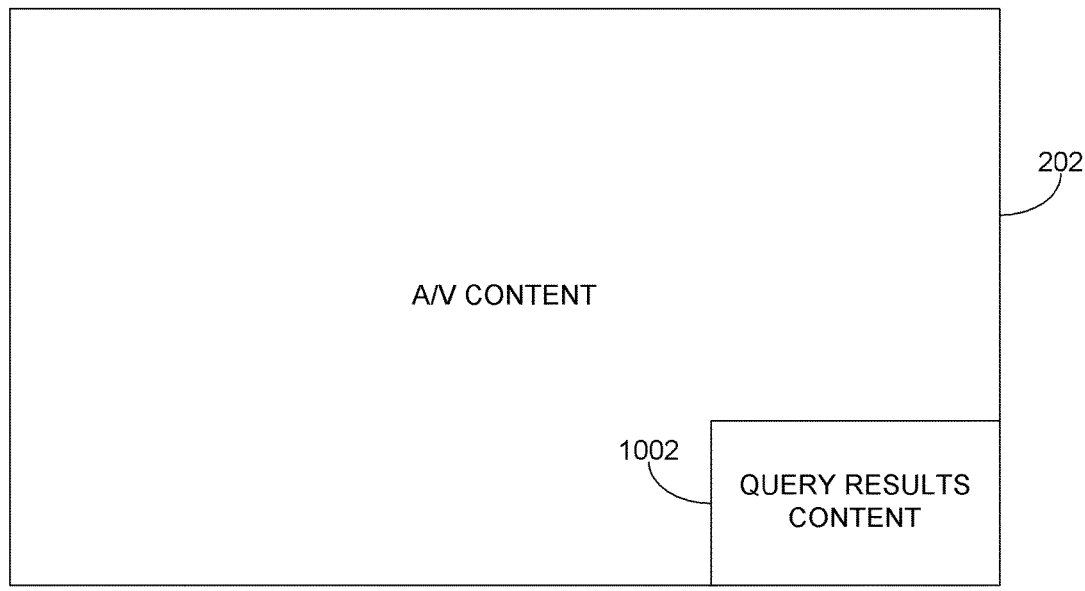
FIG. 10A is an example of a visual output which includes query result content displayed by the visual output device in FIG. 2.

When the query module 104 obtains web pages, audio, video, and images in response to its generated queries, the results may be displayed to the user along side the audio-visual content to which the generated queries relate. FIG. 10A is an example of a visual output which includes query result content displayed by the visual output device in FIG. 2. As shown, the audio-visual content is displayed on the majority of the display 202, while the additional content provided by the query module 104 is displayed in a sub-portion 1002 of the display 202. As noted briefly above, in some embodiments, the display 202 may be a television screen which receives audio-visual content from a media player device 102 which is a Blu-ray player. The sub-window 1002 in that particular implementation may take the form of a picture-in-picture (PiP) window provided by the operating software 208 of the Blu-ray player device 102. As the movie or television program progresses the query results content is also refreshed to include additional content related to the portion of the movie being watched.

Figure 10B:
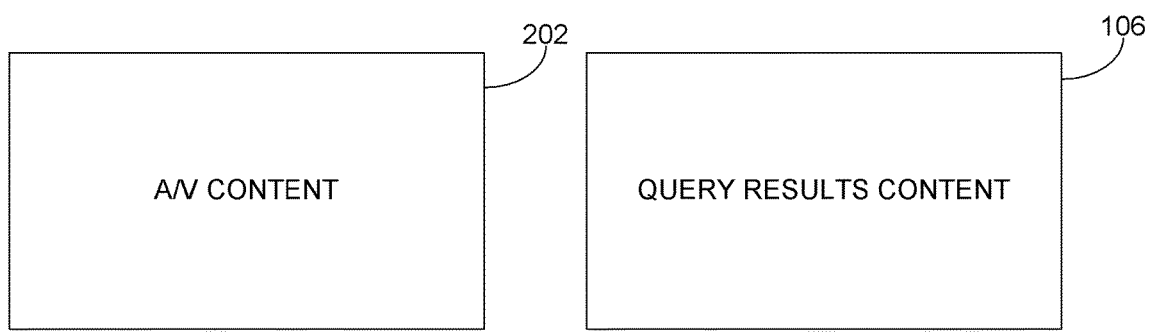
FIG. 10B is an example of how additional content may be provided via a additional display device.

In certain other embodiments, the audio-visual content may be displayed separately and apart from the additional content retrieved by the query module 104. Typically, these embodiments include the use of a additional display device 106 as shown in FIG. 1. FIG. 10B provides an example of a two display configuration. As shown, the audio-visual content may be played on the display 202 of the media player device 102, while the query results content may be concurrently displayed on a additional display device 106. In this configuration, the additional display device 106 may take the form of a laptop computer which is connected to the media player device 102.

Figure 11:
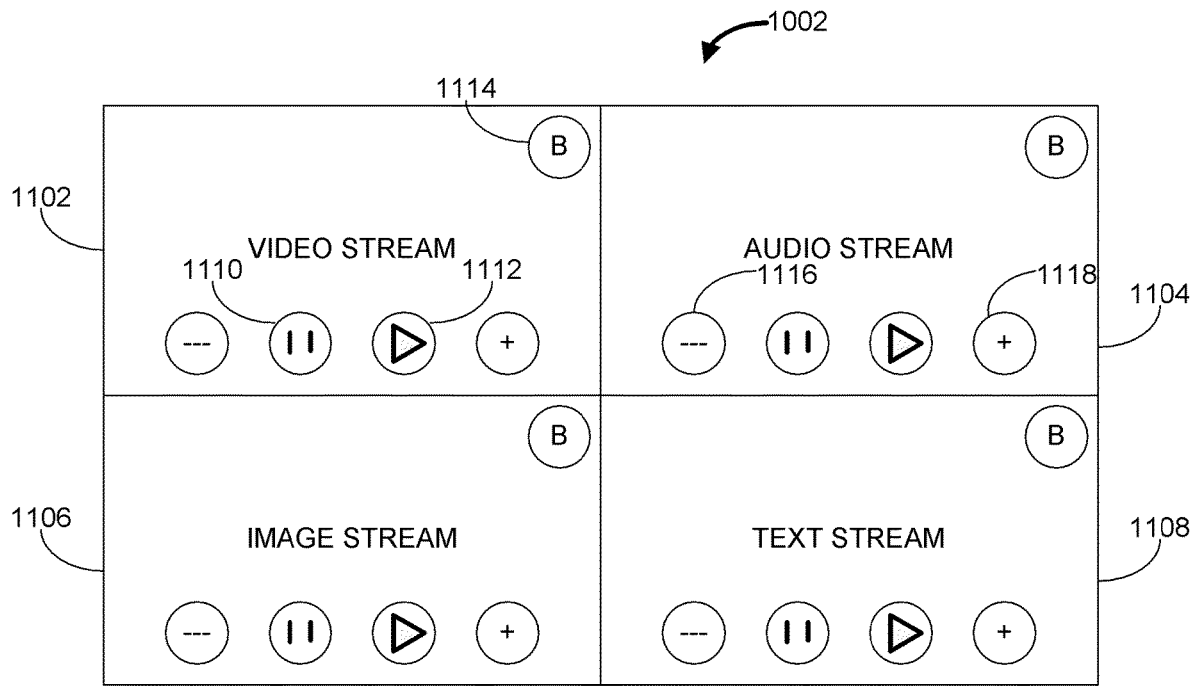
FIG. 11 is a more detailed example of how query results content may be displayed.

Turning now to FIG. 11, a more detailed view of how the query results content may be displayed in a sub-window 1002 is provided. As shown, the query results content may be divided into separate areas based on the type of content that is being delivered. In this particular example, the sub-window 1002 is divided into quadrants—one quadrant for each type of content. The first quadrant 1102 is a video stream which displays video content resulting from the generated queries. The second quadrant 1104 is an audio stream which delivers audio content resulting from the generated queries. The third quadrant 1106 is an image stream which displays images downloaded as a result of the generated queries. The fourth quadrant displays a text stream (e.g., web pages) which are downloaded as a result of the queries. In some embodiments, each of the quadrants may be configured as a streaming media player which operates independently of the other quadrants. In the example shown in FIG. 11, each of the quadrants includes a pause control 1110 which allows a user to pause the content in that quadrant. Each quadrant also includes a play control 1112 which allows a user to resume playing the content in the quadrant.

In the example shown in FIG. 11, interface controls are also provided to allow the user to manipulate specific quadrants in the sub-window 1002. These interface controls may include a maximize button 1118 which, when selected, causes the quadrant associated with the selected button to be brought full-screen, while the remaining quadrants are reduced in size or placed in the background. Each quadrant may also include a minimize button 1116, which allows the user to minimize a particular quadrant, or in some embodiments, remove it from the sub-window display 1002.

In some embodiments, a bookmarking feature may also be provided. In the example of FIG. 11, a bookmarking button 1114 is shown. The selection of the bookmarking button 1114 allows a user to bookmark a particular sequence of displayed additional content so that the viewer may watch the same sequence of additional content during a subsequent viewing of the audio-visual content. The bookmarking functionality may be configured to allow the user to bookmark specific query results, and it may also allow the user to bookmark a series or sequence of query search results. Although the example in FIG. 11 is provided in the context of a sub-window 1002, it is to be appreciated that the example from FIG. 11 could also be applied to query results content being displayed via a additional display device 106.

As discussed above, the query results may be presented to the user concurrently with the audio-visual content. By presenting the query results in each of the four quadrants simultaneously, the user may easily perceive all of additional content as it arrives in the sub-window 1002. Alternatively, the entire sub-window may display only one quadrant at a time, with the quadrants rotating in at specified intervals. If the viewer wishes to more closely view the content of the sub-window 1002, they may select the sub-window using the control functions included in the media player device 102. Selection of the sub-window 1002 may cause the audio-visual content to pause, and the contents of the sub-window 1002 to be displayed on the full screen of the display 102.

New queries may be generated as the movie progresses so that the additional content displayed to the user is related to the portion of the movie being watched. In particular, the dataprint may be structured so that specific records in the dataprint are associated with specific portions of the movie or television program. For example, if a particular scene of a movie is set in Washington, D.C., then the generated queries may relate to Washington, D.C. In the example shown in FIG. 7, the dataprint records are associated with frames in the movie. In order to generate the queries, the query module 104 must gain access to the dataprint for the audio-visual content being played in the media player device 102. In some embodiments, the dataprint may be included on the same storage media as the audio-visual content itself. However, in other embodiments described above, the dataprint may be stored on a dataprint source 110 which allows the dataprint to be dynamic over time.

Figure 12:
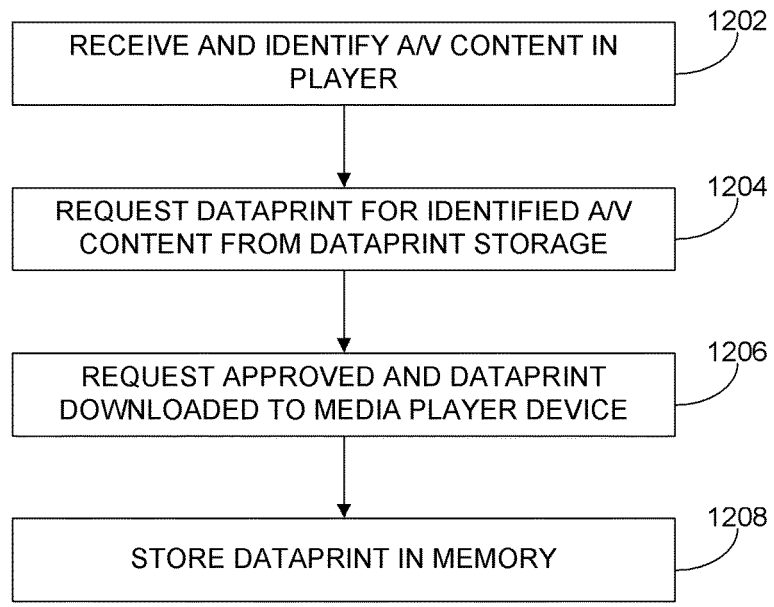
FIG. 12 is a flowchart showing a process for obtaining a dataprint from a dataprint server.

FIG. 12 is a flowchart illustrating one process by which a dataprint may be obtained from the dataprint source 110 for use by the query module 104. The process begins at block 1202, where the audio-visual content is received in the media player device 102. As noted previously, the audio-visual content may be a movie stored on a disc, such as a high definition Blu-ray disc which is inserted into an appropriate Blu-ray player. Alternatively, the audio-visual content may be a digital network download such as a MPEG-2 or MPEG-4 encoded video. Once the media player device 102 has received the audio-visual content and identified it, it requests the dataprint for the identified content from the dataprint source 110 at block 1204. The dataprint source 110 may be accessible via a network connection in an open network 130. In some embodiments, the media player device may submit credentials to the dataprint server so that the dataprint source 110 can determine that the media player device 102 is authorized to receive the dataprint content.

The process then moves to block 1206, where the dataprint associated with the audio-visual content is downloaded to the media player device 102 from the dataprint source 110. The dataprint may be downloaded using various downloading techniques such as an HTTP connection, and FTP connection, or some other type of data transfer protocol. Once the dataprint has been downloaded to the media player device 102, at block 1208 the downloaded dataprint is stored in a memory 204 on the media player device 102. The process described in FIG. 12 provides for an entire dataprint to be downloaded at once, prior to playing the audio-visual content. However, it is to be appreciated that the dataprint may also be downloaded from the dataprint source 110 as the audio-visual content is played in the media player device 102. Moreover, the download process may also involve downloading the dataprint in a piecemeal fashion in order to preserve bandwidth and other system resources.

Figure 13:
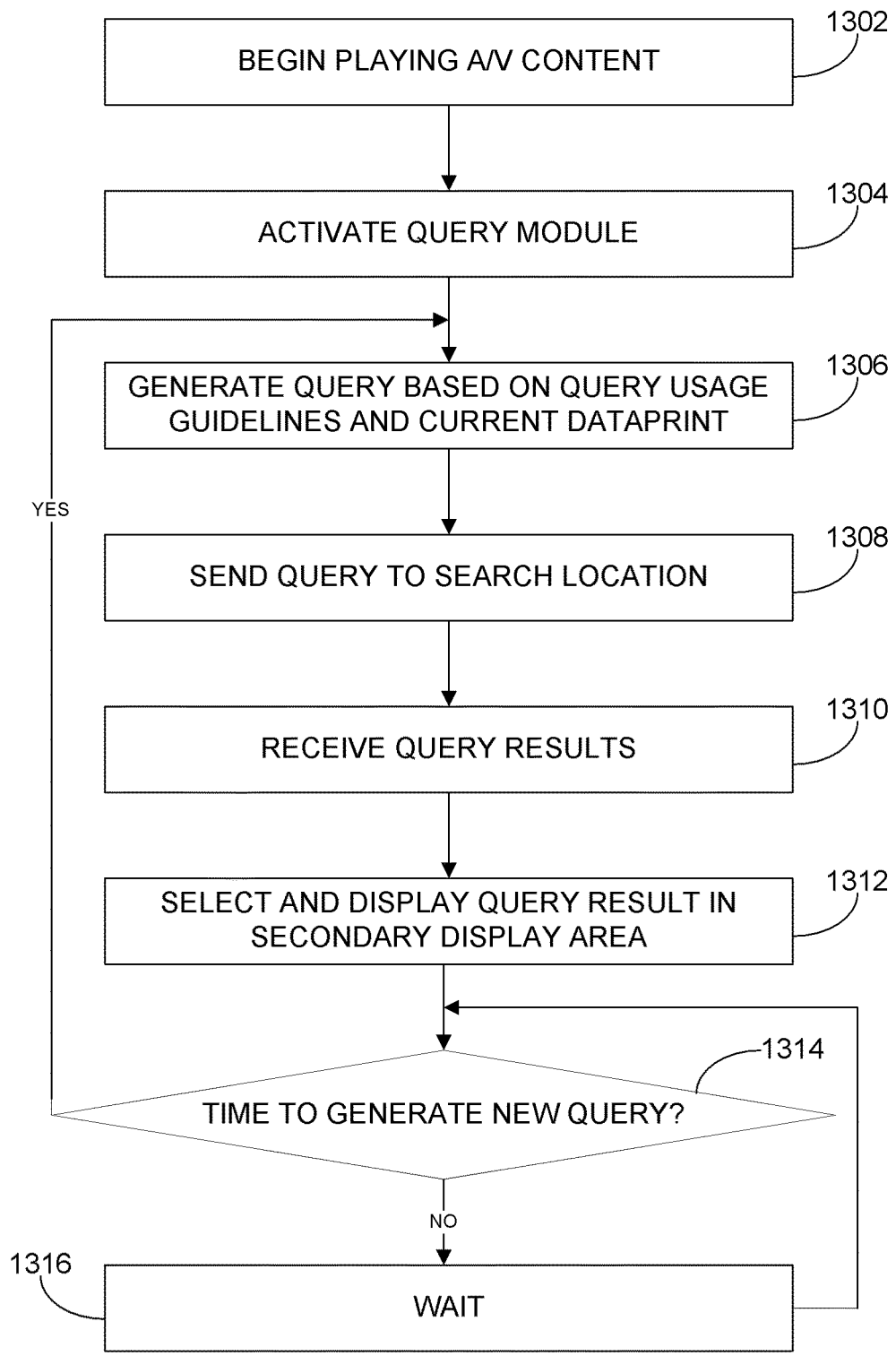
FIG. 13 is a flowchart illustrating a process by which additional content may be obtained in real-time for audio-visual content.

Once the audio-visual content has been received in the media player device 102, and the dataprint associated with the audio-visual content has been retrieved, the query module 104 may then generate queries based on the dataprint and the query usage guidelines. FIG. 13 is a flowchart illustrating a process by which parallel content may be obtained in real-time for audio-visual content using queries generated by the query module 104. The process begins at block 1302, where the media player device 102 begins to play the audio-visual content. Once the audio-visual content begins playing, the query module 104 is then activated in order to generate queries related to the audio-visual content. The process then moves to block 1306, where the query generator 302 of the query module 104 generates a query based on the query usage guidelines 302 and the dataprint associated with the audio-visual content, which, as discussed above in FIG. 12 has been stored in a memory.

Once the query has been generated, it is then sent by the query module 104 to a designated search location in block 1308. As discussed above, the search query may be sent to an Internet search engine which indexes public content 114 on an open network 130 (such as the Internet). Alternatively, the search query may search proprietary content 116 or filtered public content 118 which is located in a private network 140. Next, at block 1310, the query results may then be received by the system. In one embodiment, the results may be received by the query results handler 306 which is configured to receive and process the query results. Once the query results have been received, the process then moves to block 1312, where the query results are displayed in the secondary display area. As noted above, the secondary display area may be a picture-in-picture area 802 that is provided by the media player device 102 on its associated display 202. In other embodiments, the secondary display may be a additional display device 106 such as a computer or another television device connected to the media player device 102. Because the search query may result in a plurality of relevant results, the query results handler may select the most relevant search result for display by automatically displaying the first result generated for the query.

Once the query result is displayed on the additional display, the process then moves to decision block 1314, where the system determines whether it is time to generate a new query. The displayed result is generally displayed for a limited duration. Typically, the result will be displayed long enough for it to be perceived by the viewer, but not so long as prevent the additional content from being updated regularly as the movie or television program progresses. In some embodiments, a result display time may be set to ten seconds, but other displaying timing intervals that are shorter or longer may be used.

If at decision block 1314 the display time has expired, the process returns to block 1306 and a new query may be generated based on the query usage guidelines and the current dataprint. Because the audio-visual content has been moving forward since the last query was generated, the current dataprint is likely to be different from the previous cycle, because the records in the dataprint may be associated with specific times and frames in the audio-visual content. Moreover, in some embodiments, the new query may specify a different query type to generate at block 1306. For example, if the previous query searched for video content, the ensuing query may search for text-based content. If at decision block 1314 the refresh query time has not arrived, the process moves to block 1316 and waits and then returns to the decision block 1314 and checks the time again.

Figure 14:
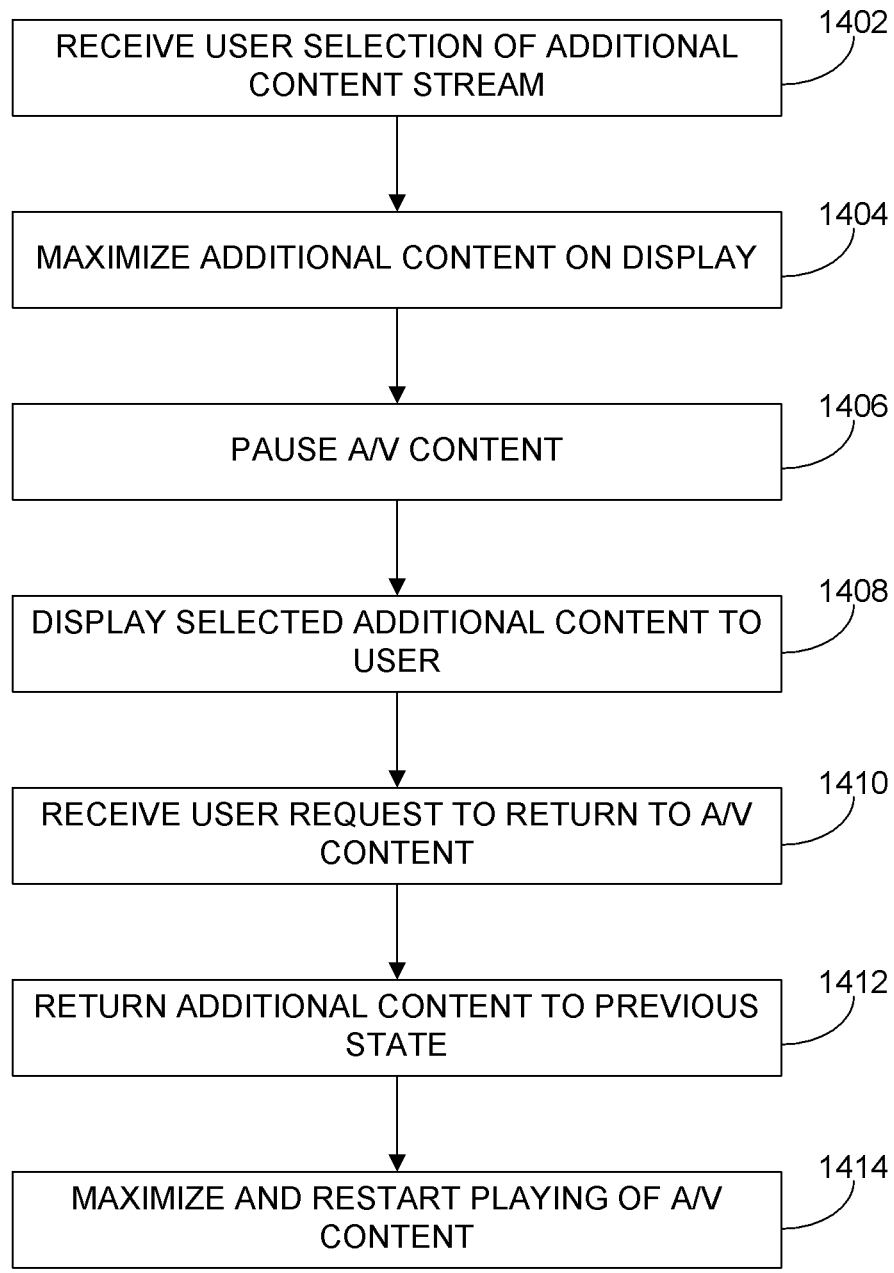
FIG. 14 is a flowchart illustrating a process by which a viewer may access additional content which has been obtained in the process shown in FIG. 13.

By displaying additional content alongside the audio-visual content, a viewer can enjoy new and interesting information relating to the audio-visual content. In some embodiments, the user may be provided the capability to access the additional content without negatively impacting their audio-visual content viewing experience. FIG. 14 is a flowchart illustrating a process by which a viewer may access the additional content which has been obtained by the process shown in FIG. 13.

The process begins at block 1402, where a user selection of the additional content stream is received by the media player device. In embodiments where the additional content is displayed with the audio-visual content in a picture-in-picture configuration, the user selection may take the form of a switching command between the two displayed windows. Upon receiving the user selection, the process then moves to block 1404, where the additional content is maximized on the display. Next, the process moves to block 1406, where the audio-visual content is automatically paused so that the viewer does not miss any of the program or movie while accessing the additional content. Once the audio-visual content has been paused, the process then moves to block 1408, where the selected additional content is displayed to the user. In some embodiments, the additional content is presented to the user in a streaming player which allows the user to pause the additional content, but does not otherwise provide any ability to access content that is not delivered by the query module 104. Once the user has finished viewing the additional content, the process then moves to block 1410, where a user requests to return to watching the audio-visual content. Upon receiving the request, the additional content may be removed from its maximized state and returned its less prominent position on the display at block 1412. The process then may move to block 1414, where the audio-visual content is brought back to the forefront and the media player device 102 begins playing the audio-visual content again.

Those of skill will recognize that the various illustrative logical blocks, modules, circuits, and algorithm steps described in connection with the embodiments disclosed herein may be implemented as electronic hardware computer software or combinations of both. To clearly illustrate this interchangeability of hardware and software, various illustrative components, blocks modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such the processor can read information from and write information to, the storage medium. In the alternative, the storage medium may be integral to the processor.

The processor and the storage medium may reside in an ASIC. The ASIC may reside in a user terminal or some other type of device. In the alternative the processor and the storage medium may reside as discrete components in a user terminal.

What is claimed is:

1. An audio-visual entertainment system for use in conjunction with a display, the audio-visual entertainment system comprising:
 a processor configured to:
  obtain an audio-visual content having a plurality of video frames;
  identify, after obtaining, the audio-visual content;
  request a dataprint associated with the identified audio-visual content from a dataprint server over a network, wherein the dataprint includes a plurality of video frame numbers each corresponding to a different video frame of the plurality of video frames of the audio-visual content, wherein first video frame numbers of the plurality of video frame numbers of the dataprint are associated with one or more of first cast members and first scene locations in one or more first video frames of the plurality of video frames of the audio-visual content, and second video frame numbers of the plurality of video frame numbers of the dataprint are associated with one or more of second cast members and second scene locations in one or more second video frames of the plurality of video frames of the audio-visual content;
  obtain, in response to the request for the dataprint, the dataprint associated with the identified audio-visual content from the dataprint server over the network;
  start playing the audio-visual content on the display;
  while playing the audio-visual content on the display, access the dataprint to generate first queries based on the first one or more of the cast members and the first scene locations associated with the first video frame numbers while the one or more first video frames of the plurality of video frames of the audio-visual content are being currently played on the display;

send the first queries over the network;

receive first data over the network in response to the first queries, wherein the first data relates to the one or more of the first cast members and the first scene locations associated with the first video frame numbers;

display the first data while playing the one or more first video frames of the plurality of video frames of the audio-visual content on the display;

while playing the audio-visual content on the display, access the dataprint to generate second queries based on the second one or more of the cast members and the second scene locations associated with the second video frame numbers while the one or more second video frames of the plurality of video frames of the audio-visual content are being currently played on the display;

send the second queries over the network;

receive second data over the network in response to the second queries, wherein the second data relates to the one or more of the second cast members and the second scene locations associated with the second video frame numbers; and display the second data while playing the one or more second video frames of the plurality of video frames of the audio-visual content on the display.

2. The audio-visual entertainment system of claim 1, wherein the first data and the second data are displayed in a second display area of the display that comprises a picture within a first display area displaying the audio-visual content.

3. The audio-visual entertainment system of claim 1, wherein the audio-visual content comprises an audio file.

4. The audio-visual entertainment system of claim 1, wherein the audio-visual content comprises a video file.

5. The audio-visual entertainment system of claim 1, wherein the first data comprises a video stream, an audio stream, an image stream, and a text stream.

6. The audio-visual entertainment system of claim 1, wherein the first data and the second data are displayed on a different display.

7. The audio-visual entertainment system of claim 1, wherein the dataprint comprises audio-visual metadata and script data associated with the audio-visual content.

8. The audio-visual entertainment system of claim 7, wherein at least some of the audio-visual metadata and script data are associated with specified portions of the audio-visual content.

9. The audio-visual entertainment system of claim 1, wherein the processor is configured to obtain the dataprint separately from obtaining the audio-visual content.

10. The audio-visual entertainment system of claim 1, wherein the first queries comprise search engine queries.

11. The audio-visual entertainment system of claim 10, wherein the first queries further comprise queries of proprietary content related to the first video frame numbers of the audio-visual content.

12. The audio-visual entertainment system of claim 11, wherein the first queries further comprise queries of public content.

13. The audio-visual entertainment system of claim 1, wherein the first queries are also based on query usage guidelines associated with a particular user of the audio-visual entertainment system, wherein the query usage guidelines include user selected preferences.

14. The audio-visual entertainment system of claim 13, wherein the user selected preferences selected by the user comprise topical preferences and data-type preferences.

15. The audio-visual entertainment system of claim 1, wherein processor is further configured to display the most relevant query result if a plurality of query results are received.

16. The audio-visual entertainment system of claim 1, wherein the processor is further configured to refresh the first queries after a predetermined period of time.

17. A method for use by an audio-visual entertainment system in conjunction with a display, the method comprising:

obtaining an audio-visual content having a plurality of video frames;

identifying, after the obtaining, the audio-visual content;

requesting a dataprint associated with the identified audio-visual content from a dataprint server over a network, wherein the dataprint includes a plurality of video frame numbers each corresponding to a different video frame of the plurality of video frames of the audio-visual content, wherein first video frame numbers of the plurality of video frame numbers of the dataprint are associated with one or more of first cast members and first scene locations in one or more first video frames of the plurality of video frames of the audio-visual content, and second video frame numbers of the plurality of video frame numbers of the dataprint are associated with one or more of second cast members and second scene locations in one or more second video frames of the plurality of video frames of the audio-visual content;

obtaining, in response to the requesting of the dataprint the dataprint associated with the identified audio-visual content from the dataprint server over the network;

starting to play the audio-visual content on the display;

while playing the audio-visual content on the display, accessing the dataprint to generate first queries based on the first one or more of the cast members and the first scene locations associated with the first video frame numbers while the one or more first video frames of the plurality of video frames of the audio-visual content are being currently played on the display;

sending the first queries over the network;

receiving first data over the network in response to the first queries, wherein the first data relates to the one or more of the first cast members and the first scene locations associated with the first video frame numbers; and displaying the first data while playing the one or more first video frames of the plurality of video frames of the audio-visual content on the display;

while playing the audio-visual content on the display, accessing the dataprint to generate second queries based on the second one or more of the cast members and the second scene locations associated with the second video frame numbers while the one or more second video frames of the plurality of video frames of the audio-visual content are being currently played on the display;

sending the second queries over the network;

receiving second data over the network in response to the second queries, wherein the second data relates to the one or more of the second cast members and the second scene locations associated with the second video frame numbers; and displaying the second data while playing the one or more second video frames of the plurality of video frames of the audio-visual content on the display.

18. The method of claim 17, wherein the audio-visual content comprises an audio file.

19. The method of claim 17, wherein audio-visual content comprises a video file.

20. The method of claim 17, wherein the first data is displayed in a second display area of the display that comprises a picture within a first display area displaying the audio-visual content.

21. The method of claim 17, wherein the first data comprises a video stream, an audio stream, an image stream, and a text stream.

22. The method of claim 17, wherein the first data is displayed on a different display.

23. The method of claim 17, wherein the dataprint comprises audio-visual metadata and script data associated with the audio-visual content.

24. The method of claim 17, wherein the obtaining of the dataprint is performed separately from the obtaining of the audio-visual content.

25. The method of claim 17, wherein the first queries comprise search engine queries.

26. The method of claim 17, wherein the first queries comprise queries of proprietary content related to the audio-visual content.

27. The method of claim 17, wherein the first queries are also based on query usage guidelines associated with a particular user of the audio-visual entertainment system, wherein the query usage guidelines include user-selected preferences.

28. The method of claim 27, wherein the user selected preferences comprise topical preferences and data-type preferences.

29. The method of claim 17, wherein displaying the first data in a second display area comprises displaying the most relevant query result if a plurality of query results are received.

30. The method claim 17 further comprises refreshing the first queries after a predetermined period of time.

31. The audio-visual entertainment system of claim 1, wherein the audio-visual content is a movie stored in a storage device, and wherein the processor is configured to obtain the movie from the storage device.

32. The audio-visual entertainment system of claim 31, wherein the storage device is a disc.

33. The audio-visual entertainment system of claim 1, wherein the audio-visual content is streamed to the audio-visual entertainment system and stored in a storage device, and wherein the processor is configured to obtain the audio-visual content from the storage device.

34. The method of claim 17, wherein the audio-visual content is a movie stored in a storage device, and wherein the obtaining obtains the movie from the storage device.

35. The method of claim 34, wherein the storage device is a disc.

36. The method of claim 17, wherein prior to the obtaining, the method further comprising:
receiving a stream of the audio-visual content; and
storing the received audio-visual content in a storage device;
wherein the obtaining obtains the audio-visual content from the storage device.

37. An audio-visual entertainment system for use in conjunction with a display, the audio-visual entertainment system comprising:
a processor configured to:
obtain an audio-visual content having a plurality of video frames;
identify, after obtaining, the audio-visual content;
request a dataprint associated with the identified audio-visual content from a dataprint server over a network, wherein the dataprint includes a plurality of video frame numbers each corresponding to a different video frame of the plurality of video frames of the audio-visual content, wherein first video frame numbers of the plurality of video frame numbers of the dataprint are associated with one or more of first cast members and first scene locations in one or more first video frames of the plurality of video frames of the audio-visual content;
obtain, in response to the request for the dataprint, the dataprint associated with the identified audio-visual content from the dataprint server over the network;
start playing the audio-visual content on the display;
while playing the audio-visual content on the display, access the dataprint to generate one or more first queries based on the first one or more of the cast members or the first scene locations associated with the first video frame numbers while the one or more first video frames of the plurality of video frames of the audio-visual content are being currently played on the display;
send the first queries over the network;
receive first data over the network in response to the one or more first queries, wherein the first data relates to the generated one of the one or more of the first cast members or the first scene locations associated with the first video frame numbers; and
display the first data while playing the one or more first video frames of the plurality of video frames of the audio-visual content on the display.

38. The audio-visual entertainment system of claim 37, wherein the first queries comprise search engine queries.

39. The audio-visual entertainment system of claim 37, wherein the audio-visual content is a movie stored in a storage device, and wherein the processor is configured to obtain the movie from the storage device.

* * * * *